United States Patent [19]

Suzuki et al.

[11] Patent Number: 4,735,520
[45] Date of Patent: Apr. 5, 1988

[54] KEY-HOLDING STRUCTURE OF KEYBOARD WITH CURVED OPERATING SURFACE OF KEYS

[75] Inventors: Makoto Suzuki; Takeyuki Takagi, both of Nagoya, Japan

[73] Assignee: Brother Kogyo Kabushiki Kaisha, Aichi, Japan

[21] Appl. No.: 75,298

[22] Filed: Jul. 17, 1987

Related U.S. Application Data

[63] Continuation of Ser. No. 770,572, Aug. 29, 1985, abandoned.

[30] Foreign Application Priority Data

Sep. 3, 1984 [JP] Japan ................... 59-185201

[51] Int. Cl.$^4$ ............................................. B41J 5/10
[52] U.S. Cl. ................................. 400/488; 400/489; 340/365 R
[58] Field of Search ............. 400/479.1, 488, 489, 400/496; 340/365 R, 365 C, 365 P

[56] References Cited

U.S. PATENT DOCUMENTS

| | | | |
|---|---|---|---|
| 4,196,348 | 4/1980 | Iwakiri et al. | 340/365 P X |
| 4,294,555 | 10/1981 | Galaske et al. | 400/488 |
| 4,363,942 | 12/1982 | Deeg et al. | 400/495 X |
| 4,467,150 | 8/1984 | Leitermann et al. | 400/488 X |
| 4,528,428 | 7/1985 | Gotoh et al. | 400/488 X |
| 4,560,844 | 12/1985 | Takamura et al. | 400/488 X |

OTHER PUBLICATIONS

Injection Molding of Plastics, Reinhold Pub. Corp., NY, by Thomas, 1947, pp. 302-313.

*Primary Examiner*—Charles Pearson
*Attorney, Agent, or Firm*—Parkhurst & Oliff

[57] ABSTRACT

A keyboard having a key-holder plate for movably supporting multiple keys of substantially the same shape and size in plural parallel rows, multiple switches disposed so as to correspond to the multiple keys and provide electrical outputs upon depression of the keys at their top faces, an upper casing having an aperture which accommodates upper portions of the keys and allows the keys to be operated, and a lower casing cooperating with the upper casing to enclose the multiple switches. The upper casing and said key-holder plate are integrally molded of a synthetic resin, and the key holder plate includes multiple guide portions which have guide holes for slidably guiding the corresponding keys between their non-operated and operated positions. The guide portions have stopper parts which determine the non-operated positions of the keys. The stopper parts are disposed along a curved reference surface which is slightly curved downwardly in a direction perpendicular to the plural parallel rows of the keys, so that an operating surface of the keys which is generally defined by the top faces is downwardly curved following a curvature of the curved reference surface.

20 Claims, 7 Drawing Sheets

KEY-HOLDING STRUCTURE OF KEYBOARD WITH CURVED OPERATING SURFACE OF KEYS

This is a continuation of application Ser. No. 770,572 filed Aug. 29, 1985, now abandoned.

BACKGROUND OF THE INVENTION

Field of the Art

The present invention relates to a keyboard assembly for providing electrical outputs corresponding to multiple keys, to signal utilization of the keys of electronic devices such as typewriters and other data processing equipment.

In such a keyboard for electronic devices, a large number of keys are disposed in plural rows to provide electronic signals corresponding to the keys which have been operated on their top faces. For increased ease of operation and identification of the keys, and for reduced fatigue of the operator, an operating surface generally defined by the top faces of the individual keys is curved to a downwardly convex shape in a plane perpendicular to the rows of the keys.

Figure 11:
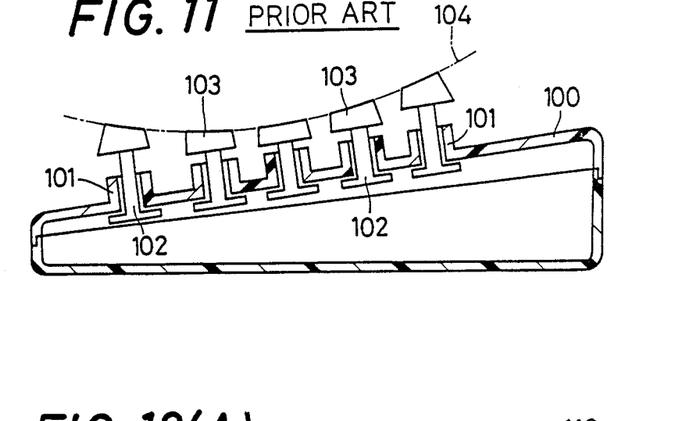

To obtain such a curved operating surface of keys, a known keyboard is constructed as illustrated in FIG. 11, wherein multiple keystem guides 101 are formed as integral parts of an upper casing 100 of the keyboard. The keystem guides 101 are formed so as to slidably support corresponding keystems 102 which carry at their upper ends respective keytops 103. The keystems 102 of the keys are formed with different lengths, and the keytops 103 are given different shapes, depending upon the rows in which the keys are disposed, whereby an operating surface defined by the curved top faces of the keytops 103 is downwardly curved.

Figure 12A:
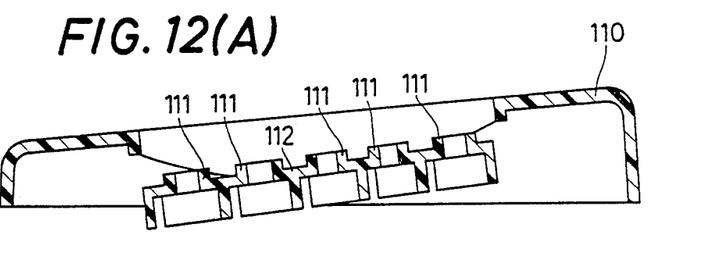
Figure 12B:
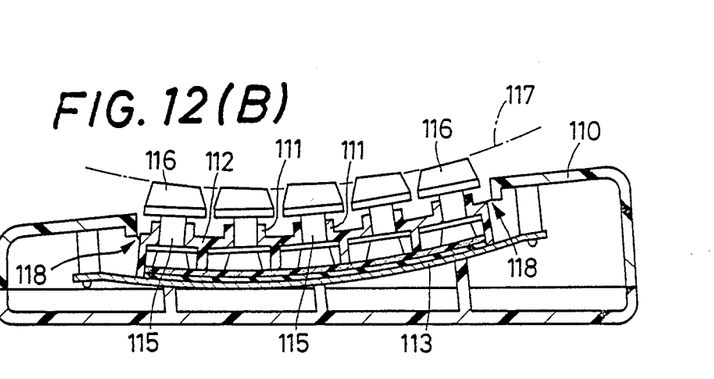

Another arrangement for establishing a downward curvature of the operating surface of the keytops is shown in FIGS. 12(A) and 12(B), which arrangement is disclosed in U.S. patent application Ser. No. 624,395 filed June 25, 1984 (and issued as U.S. Pat. No. 4,560,844 on Dec. 24, 1985), assigned in part to the assignee of the present application, and claiming the benefit of the filing dates of Japanese patent application No. 58-125740, No. 58-127529 and No. 58-127530, filed July 11, 1983, Aug. 17, 1983 and Aug. 17, 1983, respectively, which were laid open after the filing date of Japanese Patent Application No. 59-185201 the benefit of which is claimed in the present application. In this arrangement, a key-holder plate 112 has a multiplicity of keystem guides 111 for guiding keystems 115. This key-holder plate 112 is molded together with an upper casing 110 so that the key-holder plate 112 is connected, only at its limited peripheral positions, to an upper casing 110 of the keyboard. A curved retainer metal plate 113 is disposed in order to hold the otherwise flat key-holder plate 112 in a downwardly curved posture so that an operating surface 117 of keytops 116 is downwardly curved following the curvature of the retainer metal plate 113.

Problems Solved by the Invention

In the former arrangement of FIG. 11, the keystems 102 and keytops 103 are differently dimensioned and/or shaped to establish the curved operating surface 104. Accordingly, the cost of manufacture of the keyboard is increased due to the requirement of different kinds of keys.

In the latter arrangement of FIGS. 12(A) and 12(B) wherein the key-holder plate 112 is connected at its peripheral parts to the upper casing 110, the above-indicated requirement of different configurations of the keys is eliminated. However, the arrangement in question suffers another problem that gaps 118 inevitably exist between the key-holder plate 112 and the upper casing 110, at the periphery of the plate 112 which are disposed adjacent to the periphery of an aperture formed in the upper casing 110. These gaps 118 allow dirt and dust to enter the interior of the keyboard assembly, causing an operating failure of key switches. Furthermore, the installation and use of the retainer plate 113, to maintain the curvature of the key-holder plate 112, will necessarily increase the weight and mass of the keyboard assembly, and the number of assembly steps, thereby reducing the efficiency of manufacture and increasing the manufacturing cost.

SUMMARY OF THE INVENTION

It is therefore an object of the present invention to provide a keyboard having a downwardly curved operating surface of keytops for easy operation of keys, which keyboard is easy to assemble, has a minimum number of components and a reduced weight, and is protected against entry of dirt and dust.

According to the invention, there is provided a keyboard having a key-holder plate for movably supporting multiple keys of substantially the same shape and size in plural parallel rows, multiple switches disposed so as to correspond to the multiple keys and provide electrical outputs upon depression of the keys at their top faces, an upper casing having an aperture which accommodates upper portions of the keys and allows the keys to be operated, and a lower casing cooperating with the upper casing to enclose the multiple switches, characterized in that the upper casing and the key-holder plate are integrally molded of a synthetic resin, and that the key-holder plate includes multiple guide portions which have guide holes for slidably guiding the corresponding keys between their non-operated and operated positions, the guide portions having stopper parts which determine said non-operated positions of the corresponding keys, said stopper parts being disposed along a curved reference surface which is slightly curved downwardly in a direction perpendicular to the plural parallel rows of the keys, so that an operating surface of the keys which is generally defined by the top faces is downwardly curved following a curvature of the curved reference surface.

In the keyboard constructed according to the invention as described above, the key-holder plate is formed integrally with the upper casing such that the stopper parts of the guide portions of the key-holder plate for guiding the keys are arranged along the curvature of the downwardly curved reference surface, so that the operating surface defined by the top faces of the keys in their non-operated positions is downwardly curved. This arrangement eliminates the requirement of using keys of different shapes and sizes, or of using a curved retainer plate for holding the key-holder plate in a downwardly curved posture.

According to one advantageous embodiment of the invention, the guide portions of the key-holder plate are formed such that the centerlines of the guide holes are perpendicular to the curved reference surface. In this embodiment, the keys guided by the guide holes are disposed in radial directions of the curvature of the curved reference surface. This arrangement facilitates establishment of a smooth operating surface of the keys, or permits the top faces of the keys to provide an operating surface exactly following the curvature of the curved reference surface.

According to another embodiment of the invention, the guide portions of the key-holder plate are formed such that the centerlines of the guide holes are parallel to each other. This parallel arrangement of the guide holes permits easier separation of an integral cast piece of the upper casing and the key-holder plate from a mold. In this case, too, the operating surface of the keys generally defined by the top faces may be downwardly curved.

According to a further advantageous embodiment of the invention, the key-holder plate includes a support portion which supports the multiple guide portions. The support portion is downwardly curved following the curvature of the curved reference surface. However, it is not essential that the support portion be downwardly curved.

In one form of the above embodiment, each of the guide portions consists of an annular portion defining said guide hole and connected at its lower end to said support portion. In the case that the guide portions are formed such that the centerlines of the guide holes are perpendicular to the curved reference surface, it is preferred that an outer surface of the annular portion be tapered so that its outside diameter is reduced in a direction from the lower end to its upper end. In this instance, a value of taper of the outer surface is determined so as to prevent the outer surface of the annular portion from having an undercut section as viewed in a direction parallel to a line which passes a central part of the key-holder plate at right angles. The thus tapered outside diameter of the annular portion permits easier removal of a mold from the integral cast piece of the upper casing and the key-holder plate, even with the annular portions extending in radial directions of the curved reference surface.

According to a still further embodiment of the invention, the keyboard further comprises: a plurality of downward bosses extending downwardly from the upper casing; a printed circuit board disposed below the key-holder plate and having stationary electrodes which cooperate with movable electrodes movable with the keys, to constitute the switches; means for defining a curvature substantially parallel to the curvature of the curved reference surface; and fasteners for fixing the printed circuit board to the downward bosses. The fasteners cooperate with the curvature defining means to hold the printed circuit board in a curved configuration so as to follow the curvature of the curved reference surface.

In accordance with another embodiment of the invention, each of said keys comprises a keystem of a circular transverse cross sectional shape extending through the corresponding guide hole of the key-holder plate, a keytop provided on an upper end of the keystem and having the top face, and a rectangular bottom plate provided on a lower end of the keystem at right angles thereto.

In one form of the above embodiment, the key-holder plate has transverse partition walls each of which extends downwardly from between a corresponding pair of the guide holes, the transverse partition walls being formed perpendicularly to the plural parallel rows of the keys, and slidably contacting two opposite sides of the rectangular bottom plate of the keys to thereby prevent the keys from rotating about centerlines of the keystems. The transverse partition walls may be formed so that their lower end faces cooperate with each other to generally define a curvature which follows the curvature of the curved reference surface. In this case, a printed circuit board is fixed to the upper casing in pressed contact with the curvature defined by the lower end faces of the transverse partition walls.

The key-holder plate may further have longitudinal partition walls extending downwardly from between parallel rows of the guide holes corresponding to the plural parallel rows of the keys. The longitudinal partition walls connect adjacent walls of the transverse partition walls, and cooperate with the transverse partition walls to surround the periphery of the rectangular bottom plates of the keys.

The longitudinal partition walls may be formed with a substantially constant thickness over their entire height and extend downwardly parallel to each other. Alternatively, the longitudinal partition walls may be tapered such that a thickness thereof is reduced in a direction from the planar portion of the key-holder plate toward a tip thereof, a value of taper of the longitudinal partition walls being determined so as to prevent the longitudinal partition walls from having an undercut section, as viewed in a direction parallel to a line which passes a central part of the key-holder plate at right angles. In either case, the cast piece of the upper casing and the key-holder plate may be easily removed from the mold.

According to still another embodiment of the invention, the lower casing has a bottom portion and plural support walls which extend upwardly from the bottom portion to support a printed circuit board having stationary electrodes which cooperate with movable electrodes movable with the keys to constitute the switches.

BRIEF DESCRIPTION OF THE DRAWING

The manner in which the foregoing and other objects of this invention are accomplished will be apparent from the accompanying specification and claims, when considered in connection with the accompanying drawings, in which:

FIGS. 11, 12 (A) and 12(B) are elevational views in cross section of known keyboards with their keytops defining a curved operating surface.

DETAILED DESCRIPTION OF THE PREFERRED EMBODIMENTS

The present invention will be described in more detail, referring to the accompanying drawings showing, for illustrative purposes only, a preferred embodiment of a keyboard of the invention which incorporates multiple capacitive key switches.

Figure 1:
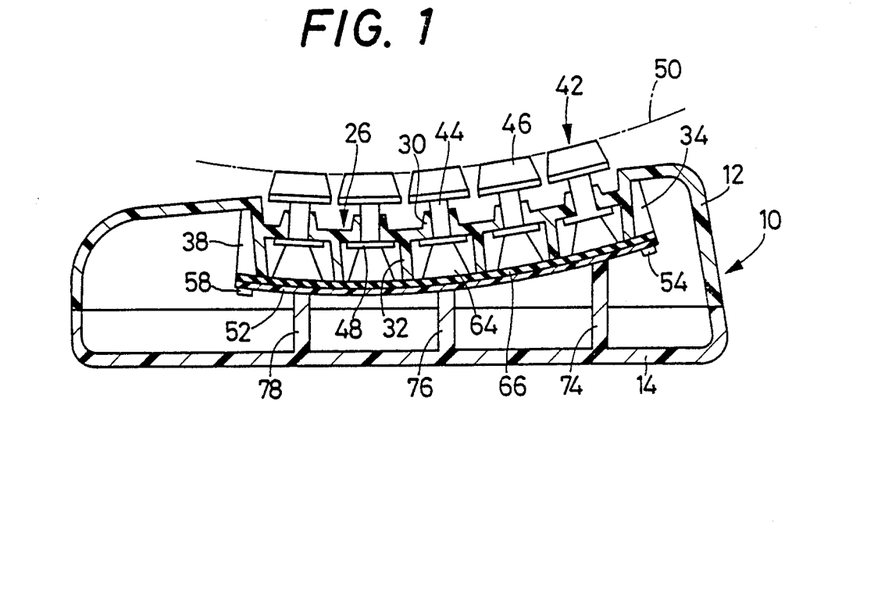
FIG. 1 is an elevational view in cross section of one embodiment of a keyboard of the invention.
Figure 2:
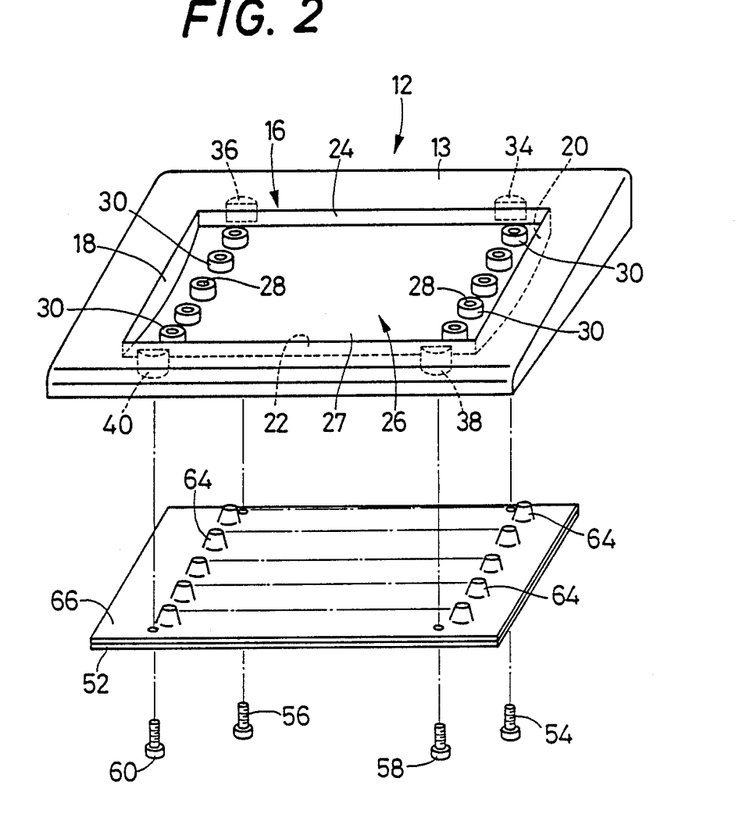
FIG. 2 is a fragmentary, exploded view in perspective of the keyboard of FIG. 1.
Figure 3:
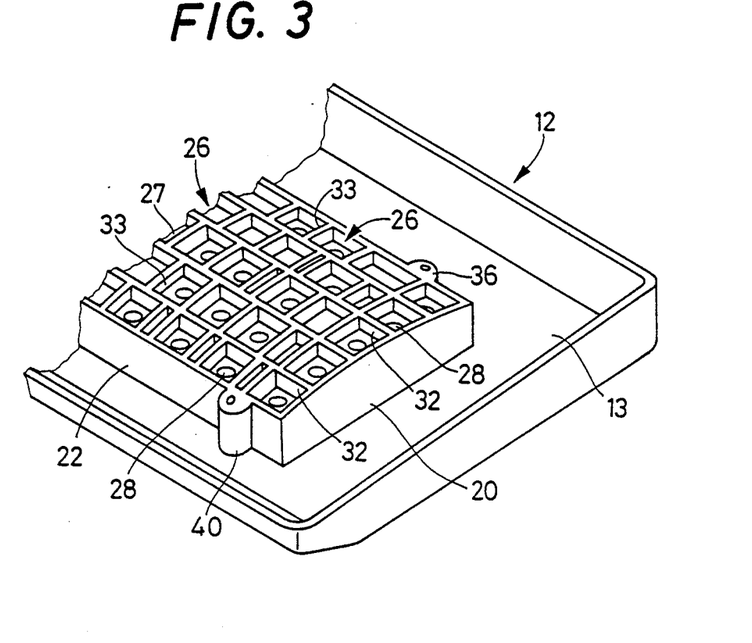
FIG. 3 is a fragmentary perspective bottom view of an upper casing of the keyboard.

There is shown in FIG. 1 a keyboard housing generally indicated at 10. The keyboard housing 10 includes an upper casing 12 and a lower casing 14, both of which are made of a synthetic resin and have a generally rectangular shape as viewed in a plan view. As shown in FIG. 2, the upper casing 12 includes a generally flat top frame portion 13 which has a rectangular aperture 16 formed through its thickness. The upper casing 12 has integrally formed downward extensions 18, 20, 22, 24 which extend downwardly from respective inner sections of the top frame portion 13 defining the four sides of the rectangular aperture 16. More specifically, the left and right downward extensions 18, 20 extend downwardly from the opposite shorter sides of the aperture 16, while the front and rear downward extensions 22, 24 extend downwardly from the opposite longer sides of the aperture 16. These downward extensions 18, 20, 22, 24 are formed with a curved key-holder plate 26 having a support portion 27. The support portion 27 is slightly curved downwardly in a direction perpendicular to the length of the upper casing 12 (aperture 16), i.e., in a direction parallel to the left and right downward extensions 18, 20. Thus, the top frame portion 13 having the downward extensions 18, 20, 22, 24, and the curved key-holder plate 26 are molded as an integral one-piece casting, such that there exist no gaps between the periphery of the key-holder plate 26 and the top frame portion 13.

Figure 4:
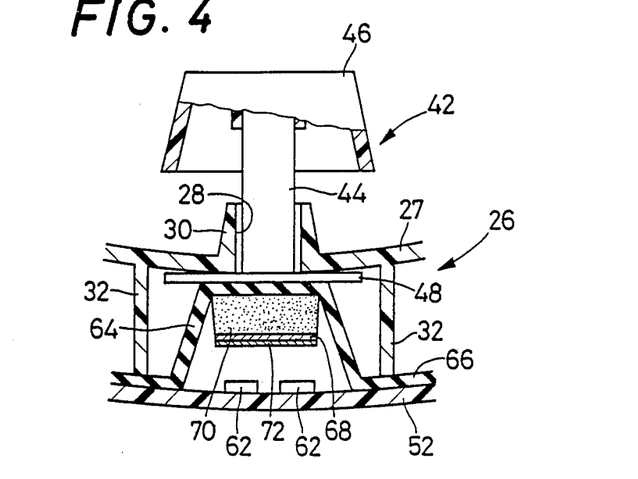
FIG. 4 is a cross sectional view in enlargement, showing one of multiple key switches incorporated in the keyboard.

The key-holder plate 26 has a multiplicity of annular guide portions 30 of the same size and shape each of which has a guide hole 28 and extends upwardly from the support portion 27, as shown in FIGS. 2 and 4. In other words, the annular guide portions 30 are connected at their lower ends to the curved support portion 27. These annular guide portions 30 are disposed in five parallel rows which correspond to five parallel rows of keys 42 along the length of the upper casing 12 (parallel to the front and rear downward extension walls 22, 24). The keys 42 have keystems 44 of a circular transverse cross sectional shape, which are inserted through the guide holes 28. Thus, the keys 42 are supported and guided by the annular guide portions 30 such that the keys 42 are movable between their upper and lower positions (non-operated and operated positions) of FIGS. 4 and 6, respectively.

The annular guide portions 30 are formed such that the centerlines of the guide holes 28 are perpendicular to the downwardly curved surface of the support portion 27, so that the keystems 44 of the keys 42 extend in radial directions of the curvature of the support portion 27. For easy removal of a cast piece of the upper casing 12 and the key-holder plate 26 from a mold (which will be described referring to FIG. 5), an outer surface of each annular guide portion 30 is tapered such that its outside diameter is reduced from its lower end to its upper end, as most clearly shown in FIG. 4. A value of taper of the outer surface of the guide portion 30 is determined so that the outer surface will not have an undercut section as viewed in a direction parallel to a line which passes a central part of the key-holder plate 26 at right angles, more particularly, as viewed in the direction parallel to the centerline of the keystems 44 of the keys 42 disposed in the intermediate or third row. Namely, it is in this direction that the integrally cast piece of the upper casing 12 and the key-holder plate 26 is released from the mold, as described later.

On the lower surface of the support portion 27 remote from the annular guide portions 30, there are formed longidudinal and transverse partition walls 32, 33, integrally with the support portion 27. These partition walls 32, 33 cooperate with the support portion 27 to define box-like spaces which accommodate rectangular bottom plates 48 connected to the lower end of the keystems 44. Stated in greater detail, the longitudinal partition walls 32 are formed to run parallel to the rows of the keys 42 and are disposed between adjacent parallel rows of the guide holes 28. Further, the longitudinal partition walls 32 have a constant thickness over their entire height and extend downwardly parallel to each other in the direction parallel to the centerline of the keystems 44 of the keys 42 in the intermediate rows. With this parallel arrangement of the longitudinal partition walls 32, the cast piece may be easily removed from the mold, as described later. In the meantime, the transverse partition walls 33 are disposed perpendicularly to the longitudinal partition walls 32 and between the corresponding adjacent guide holes 28. Like the longitudinal partition walls 32, the transverse partition walls 33 extend downwardly in the direction parallel to the centerline of the keystems 44 of the keys 42 in the intermediate row. The rectangular bottom plates 48 are dimensioned so that their opposite sides may contact the transverse partition walls 33 in order to prevent the keys 42 from being rotated about the centerline of their keystems 44. It is noted that since the keystems 44 are guided by the guide holes 28 in the radial directions of the curvature of the curved support portion 27, the rectangular bottom plates 48 of the keys 42 except those in the intermediate row should be so dimensioned that there exist sufficient clearances to the adjacent longitudinal partition walls 33, otherwise the bottom plates 48 would interfere with the longitudinal partition walls 33, and prevent movement of the keys 42. The key 42 shown in FIG. 4 is the one which is disposed in the intermediate row.

The longitudinal and transverse partiton walls 32, 33 are formed so that their end faces cooperate to generally define a curvature substantially parallel to the curvature of the downwardly curved support portion 27. The front and rear downward extensions 22, 24 are formed with four downward bosses 34, 36, 38 and 40 which extend downwardly from the lower surface of the top frame portion 13 of the upper casing 12. A printed circuit board 52 is fixed to the downward bosses 34, 36, 38, 40 with fasteners in the form of screws 54, 56, 58 and 60, such that the board 52 is held in pressed contact with the lower end faces of the longitudinal and transverse partition walls 32, 33. Thus, the printed circuit board 52 is held downwardly curved following the curvature of the support portion 27 of the key-holder plate 26.

As shown in FIG. 4, the printer circuit board 52 has on its upper surface a printed pattern of conductors, i.e., multiple pairs of stationary electrodes 62, each pair being aligned with the guide hole 28, and consequently, with the rectangular bottom plate 48 of the corresponding key 42. These pairs of stationary electrodes 62 are enclosed within corresponding frusto-conical or truncated conical elastic housings 64 which are formed as integral parts of an elastomeric member 66 disposed on the upper surface of the printed circuit board 52. Each of the frusto-conical elastic housings 64 has a top wall which is spaced from and opposite to the stationary electrodes 62. A sponge member 70 is bonded at its one surface to an inner surface of the top wall of the elastic housing 64. The sponge member 70 carries on the other surface a movable electrode 68 made of an aluminum foil or other flexible conductive material. The movable electrode 68 is covered with a thin insulating film 72 made of a synthetic resin or other flexible insulating material. The stationary electrodes 62, movable electrode 68 and insulating film 72 constitute a key-operated switch of variable capacitor type.

The rectangular bottom plate 48 of the key 42 rests on the upper surface of the top wall of the elastic housing 64. With this arrangement, the key 42 is biased upward by an elastic force of the elastic housing 64. Thus, the key 42 is normally held in its upper non-operated position of FIG. 4. In this non-operated position, the bottom plate 48 is forced against the lower surface of the support portion 27 (lower end of the annular guide portion 30) of the key-holder plate 26. Accordingly, top faces of keytops 46 at the upper end of the keys 42 generally define a downwardly curved operating surface 50 (FIG. 1) whose curvature substantially follows the curvature of the lower surface of the support portion 27 of the key-holder plate 26. In this specific example, the lower ends of the individual annular guide portions 30 serve as stopper parts which determine the non-operated positions of the keys 42. These stopper parts are disposed along the curvature of the lower surface of the support portion 27 which provides a reference surface which determines the curvature of the operating surface 50. As will be described later, the concept of the invention may be practiced, provided that a curved reference surface is defined by suitable stopper parts of guide portions which are formed on the key-holder plate 26 for supporting and guiding the keys 42. In the present embodiment, the guide portions consist of the annular guide portions 30, and their lower ends function as the stopper parts which limit the upward movements of the keys 42 and thereby determine their upper non-operated positions. It is noted that the operating surface 50 of the keys 42 is established while the keys 42 are placed in their non-operated positions.

Referring back to FIG. 1, the bottom portion of the lower casing 14 has three upwardly extending support walls 74, 76 and 78 on which the printed circuit board 52 is supported at its lower surface. The support walls 74, 76, 78 are disposed parallel to each other along the length of the lower casing 14, and are spaced from each other in the transverse direction of the lower casing 14. The heights of these support walls 74, 76, 78 are selected so that a curvature generally defined by their upper end faces is substantially equal to the curvature of the printed circuit board 52 which is held in pressed contact with the lower end faces of the longitudinal and transverse partition walls 32, 33 of the key-holder plate 26.

Figure 5:
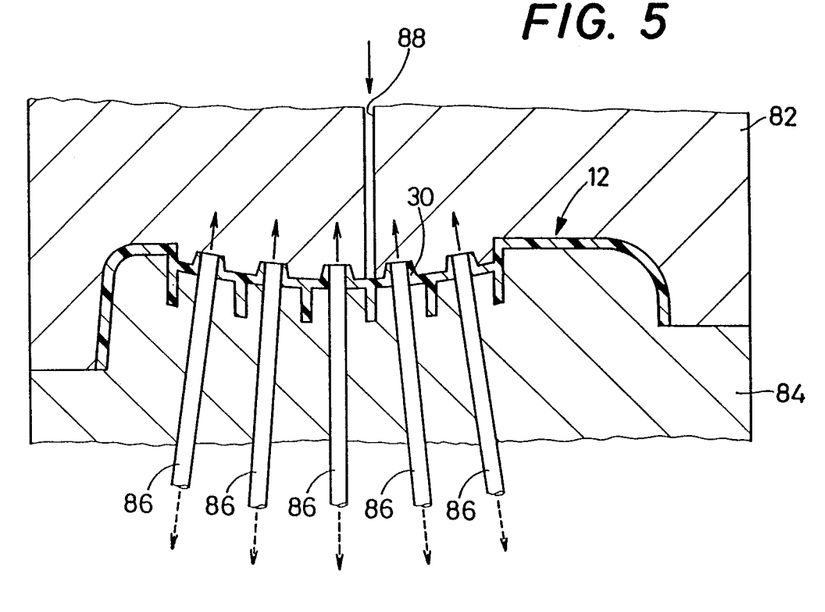
FIG. 5 is an elevational view in cross section of a mold for forming the upper casing.

Referring next to FIG. 5, there will be described the manner in which the upper casing 12 and the key-holder plate 26 are molded as an integral cast piece.

A stationary mold 82 attached to a stationary mold plate (not shown) has an upper molding surface which is formed to the profile of the upper surfaces of the upper casing 12 and the key-holder plate 26. On the other hand, a movable mold 84 attached to a movable mold plate has a lower molding surface which is formed to the profile of the lower surface of the upper casing 12 and the key-holder plate 26. The movable mold 84 has holes which accommodate slidable cores 86 in the form of rods. The holes are formed so that the slidable cores 86 are oriented in radial directions of the curvature of the support portion 27 of the key-holder plate 26, in order to form the guide holes 28 in the annular guide portions 30. A mold cavity is defined by the upper molding surface of the stationary mold 82 and the lower molding surfce of the movable mold 84, when the stationary and movable molds 82, 84 are clamped together with the slidable cores 86 held in place (after the cores 86 are positioned in the radial directions indicated by solid-line arrows in FIG. 5). A melt of a suitable resin is injected into the cavity through a sprue 88 communicating with the cavity. Thus, the upper casing 12 and the key-holder plate 26 may be cast in one piece, such that the support portion 27 is slightly curved downwardly while the guide holes 28 are formed in the radial directions of the curvature of the support portion 27.

After the molten resin in the cavity has been sufficiently cured, the slidable cores 86 are removed from the mold 84 by slidably retracting them in the radial directions indicated by broken-line arrows in FIG. 5. Subsequently, the movable mold 84 is separated from the stationary mold 82, together with the cast piece. Since the annular guide portions 30 are tapered as previously described, the cast piece may be easily separated from the stationary mold 82. Then, the cast piece is removed from the movable mold 84 by activating pusher or ejector pins (not shown). Since the longitudinal partition walls 32 extend parallel to each other in the direction parallel to the centerline of the keys 42 in the intermediate third row, the cast piece may be easily removed from the movable mold 84 by moving the cast piece in the direction parallel to the centerline of the keys 42 in the third row.

As described above, the use of the slidable cores 86, the tapered configuration of the annular guide portions 30, and the parallel arrangement of the longitudinal partition walls 32, permit easy removal of the integral cast piece of the upper casing 12 and the key-holder plate 26 from the molds 82, 84, even with the centerlines of the guide holes 28 being oriented in the radial directions of the curvature of the downwardly curved support portion 27.

In assembling the keyboard constructed as described hitherto, the keystems 44 of the keys 42 are first inserted through the guide holes 28 such that the rectangular bottom plates 48 are located within the respective spaces defined by the partition walls 32, 33. Then, the keytops 46 are bonded to the upper end of the keystems 44. Thus, the keys 44 are slidably supported by the key-holder plate 26, such that rotary movements of the keys 42 are prevented by means of contact of the bottom plates 48 with the transverse partition walls 33.

In the meantime, the elastomeric member 66 having the movable electrodes 68 and the insulating films 72 within their frusto-conical elastic housings 64 is positioned on the printed circuit board 52 so that the movable electrodes 68 are aligned with the stationary electrodes 62. Subsequently, the printed circuit board 52 with the elastomeric member 66 positioned thereon is fixed to the downward bosses 34, 36, 38, 40 by means of the screws 54, 56, 58, 60, respectively, so that the frusto-conical housings 64 are aligned with the bottom plates 48 of the keys 42. As a result, the upper surface of the elastomeric member 66 is held in pressed contact with the lower end faces of the longitudinal and transverse partition walls 32, 33, whereby the printed circuit board 52 is downwardly curved following the curvature which is generally defined by the lower end faces of the partition walls 32, 33, i.e., following the curvature of the support portion 27 of the key-holder plate 26. In this condition, the frusto-conical elastic housings 64 urge the bottom plates 48 of the keys 42 against the lower surface of the support portion 27, thereby holding the keys 42 in their non-operated position of FIG. 4. Thus, the top faces of the keytops 46 define the downwardly curved operating surface 50 whose curvature follows the curvature of the support portion 27 which, in this embodiment, serves as a curved reference surface along which the lower ends of the annular guide portions 30 are disposed.

Successively, the upper casing 12 with the key-holder plate 26 and the printed circuit board 52 is secured to the lower casing 14, in such manner that the downwardly curved printed circuit board 52 rests on the support walls 74, 76 and 78.

Figure 6:
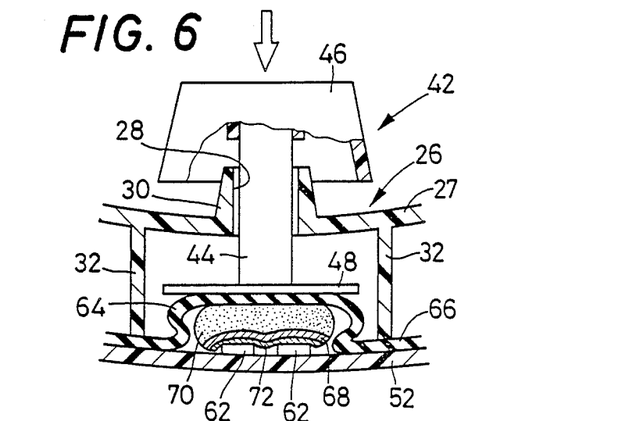
FIG. 6 is a cross sectional view in enlargement, showing the key switch of FIG. 4 in its closed or operated position upon depression of the key.

The operation of the key switches will be described by reference to FIGS. 4 and 6.

Upon depression of the key 42 on its keytop 46 while the key 42 is placed in its non-operated position of FIG. 4, the key 42 is moved downward while the keystem 44 is guided by the annular guide portion 30, whereby the top wall of the corresponding elastic housing 64 is pushed down by the bottom plate 48. As a result, the assembly of the sponge member 70, movable electrode 68 and insulating film 72 is moved toward the stationary electrodes 62, and the movable electrode 68 covered with the insulating film 72 is brought into indirect contact with the stationary electrodes 62, as shown in FIG. 6. In this operated position, the two stationary electrodes 62 are capacitively coupled to each other, and a high frequency signal is transmitted from one of the electrodes 62 to the other. Since the printed circuit board 52 is downwardly curved following the curvature of the support portion 27 of the key-holder plate 26, the distances between the non-operated and operated positions of all keys 42 are made equal.

When the operator's finger pressure is released from the keytop 46, the resilient force of the elastic housing 64 causes the key 42 and the movable electrode assembly 68, 70, 72 to be moved upward toward their original non-operated position of FIG. 4, at which the bottom plate 48 is forced against the lower surface of the support portion 27 of the key-holder plate 26. The bottom plate 48 prevents the key from being pulled out of the guide hole 28, and from rotating about its centerline. Thus, releasing the finger pressure from the keytop 46 will cause the movable electrode 68 to be separated from the stationary electrodes 62, and cease the signal transfer between the two stationary electrodes 62.

Referring to FIGS. 7-10, modified embodiments of the invention will be described.

Figure 7:
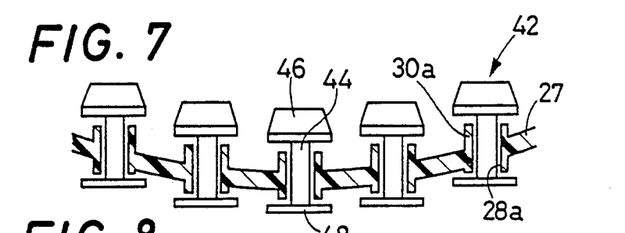
FIGS. 7–10 are schematic views showing modified embodiments of the invention.

An embodiment of FIG. 7 is different from the preceding embodiment in that annular guide portions 30a are formed such that their guide holes 28a extend parallel to each other, rather than extend in the radial directions of the curvature of the support portion 27. Further, the support portion 27 supports the annular guide portions 30a at their intermediate part between the upper and lower ends. The parallel arrangement of the annular guide portions 30a is a substitute for the tapered configuration of the annular guide portions 30 of the first embodiment.

Figure 8:
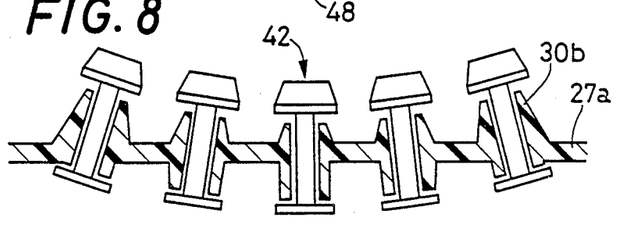

While the key-holder plate 26 of the embodiments of FIGS. 1 and 7 uses the curved support portion 27, it is possible to use a flat or straight support portion 27a as illustrated in FIG. 8. In this instance, the flat support portion 27a supports annular guide portions 30b at different axial positions depending upon their position in the direction of the plane of the flat support portion 27a.

Figure 9:
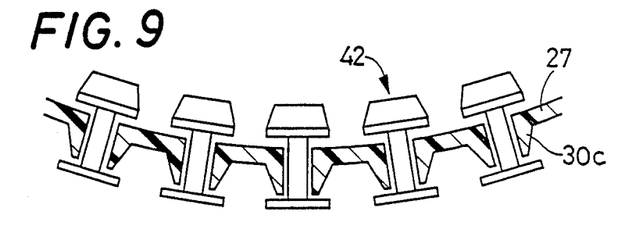

A further modified form of the key-holder plate is illustrated in FIG. 9, in which the curved support portion 27 supports annular guide portions 30c at their upper ends.

Figure 10:
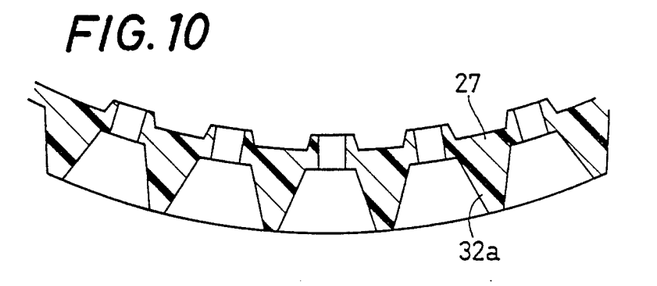

Although the longitudinal partition walls 32 used in the first embodiment extend downwardly parallel to each other from the support portion 27 for easy removal of the cast piece from the mold, it is possible to use longitudinal partition walls 32a as illustrated in FIG. 10. These longitudinal partition walls 32a are tapered so that the wall thickness is reduced in the direction from their upper end toward their lower end. Values of taper of the individual partition walls 32a are determined so as to prevent the partition walls 32a from having an undercut section as viewed in the direction in which the cast piece is removed from the mold, that is, in the direction parallel to the centerlines of the keys 42 in the intermediate third row.

While the present invention has been described in its preferred embodiments with a certain degree of particularlity, it is to be understood that the invention is not confined to the illustrated embodiments, but may be otherwise embodied with various changes and modifications which may occur to those skilled in the art, in light of the foregoing teachings.

For example, the invention may be embodied as a keyboard which incorporates key switches of mechanical contact type, rather than the illustrated key switches of capacitive type.

What is claimed is:

1. A keyboard having a key-holder plate for movably supporting multiple keys of substantially the same shape and size in a plurality of parallel rows, multiple switches disposed so as to correspond to the multiple keys and provide electrical outputs upon depression of the keys at their top faces, an upper casing having a substantially rectangular aperture which accommodates upper portions of the keys and allows the keys to be operated, and a lower casing cooperating with the upper casing to enclose the multiple switches, wherein the improvement comprises:

said upper casing and said key-holder plate being integrally molded of a synthetic resin, said upper casing having a pair of downward extensions extending downwardly from respective portions of inner surfaces of the upper casing which define opposite sides of said aperture perpendicular to said parallel rows of the keys, said key-holder plate having a support portion which is materially connected at its opposite longitudinal ends to said pair of downward extensions over entire lengths of the downward extensions and longitudinal ends, during molding of said upper casing and said key-holder plate as an integral one-piece casting, said key-holder plate support portion being slightly downwardly curved in a plane perpendicular to the parallel rows of the keys thereby providing a curved reference surface;

said key-holder plate support portion supporting multiple annular guide portions which have guide holes for slidably guiding the corresponding keys between their non-operated and operated positions, said guide portions being formed such that centerlines of said guide holes extend in radial directions of the curvature of said curved reference surface, said guide portions having stopper parts which determine said non-operated positions of the corresponding keys, said stopper parts being disposed along the curvature of said curved reference surface, so that an operating surface of the keys which is generally defined by said top faces is downwardly curved following the curvature of said curved reference surface;

each of said annular guide portions having an inclined outer surface, an angle of inclination of said outer surface being determined so as to prevent said outer surface from having an undercut section as viewed in a direction parallel to a line which passes through a central part of said key-holder plate at right angles thereto; and said key-holder plate further including longitudinal partition walls which extend downwardly parallel to each other from between parallel rows of said guide holes corresponding to said parallel rows of said keys, and transverse partition walls each of which extends downwardly from between a corresponding pair of said guide holes, said transverse patition walls being formed perpendicularly to said parallel rows of the keys so as to connect adjacent longitudinal partition walls, said transverse partition walls having lower end faces which cooperate with each other to generally define a curvature following the curvature of said curved reference surface.

2. A keyboard according to claim 1, wherein said annular guide portions of the key-holder plate are formed such that the centerlines of said guide holes are perpendicular to said curved reference surface.

3. A keyboard according to claim 1, where in each of said annular guide portions is connected at a lower end thereof to said support portion, said tapered outer surface of said each annular guide portion having an outside diameter which is reduced in a direction from said lower end toward an upper end thereof.

4. A keyboard according to claim 3, wherein said annular guide portions of the key-holder plate are formed such that the centerlines of said guide holes are perpendicular to said curved reference surface.

5. A keyboard according to claim 1, further comprising:
a plurality of downward bosses extending downwardly from said upper casing;
a printed circuit board disposed below said key-holder plate and having stationary electrodes which cooperate with movable electrodes movable with said keys, to constitute said switches;
means for defining a curvature substantially parallel to the curvature of said curved reference surface; and
fasteners for fixing said printed circuit board to said downward bosses, said fasteners cooperating with said curvature defining means to hold said printed circuit board in a curved configuration so as to follow the curvature of said curved reference surface.

6. A keyboard according to claim 1, wherein each of said keys comprises a keystem of a circular transverse cross sectional shape extending through the corresponding guide hole of the key-holder plate, a keytop provided on an upper end of said keystem and having said top face, and a rectangular bottom plate provided on a lower end of said keystem at right angles thereto.

7. A keyboard according to claim 6, said transverse and longitudinal partition walls cooperating to surround the periphery of said rectangular bottom plates of the keys, such that said transverse partition walls slidably contact two opposite sides of said rectangular bottom plates of the keys to thereby prevent said keys from rotating about centerlines of the keystems.

8. A keyboard according to claim 7, further comprising a printed circuit board having stationary electrodes which cooperate with movable electrodes movable with said keys to constitute said switches, said transverse partition walls having lower end faces which cooperate with each other to generally define a curvature following the curvature of said curved reference surface, said printed circuit board being fixed to said upper casing in pressed contact with the curvature defined by said lower end faces of the transverse partition walls.

9. A keyboard according to claim 1, further comprising a printed circuit board having stationary electrodes which cooperate with movable electrodes movable with said keys to constitute said switches, said lower casing having a bottom portion and plural support walls which extend upwardly from said bottom portion to support said printed circuit board.

10. A keyboard according to claim 1, wherein each of said annular guide portions is connected at an upper end thereof to said support portion, said tapered outer surface of said each annular guide portion having an outside diameter which is reduced in a direction from said upper end toward a lower end thereof.

11. A keyboard having a key-holder plate for movably supporting multiple keys of substantially the same shape and size in a plurality of parallel rows, multiple switches disposed so as to correspond to the multiple keys and provide electrical outputs upon depression of the keys at their top faces, an upper casing having a substantially rectangular aperture which accommodates upper portions of the keys to be operated, and a lower casing cooperating with the upper casing to enclose the multiple switches, wherein the improvement comprises:
said upper casing and said key-holder plate being integrally molded of a synthetic resin, said upper casing having a pair of downward extensions extending downwardly from respective portions of inner surfaces of the upper casing which define opposite sides of said aperture perpendicular to said parallel rows of the keys, said key-holder plate having a support portion which is materially connected at its opposite longitudinal ends to said pair of downward extensions over entire lengths of the downward extensions and longitudinal ends, during molding of said upper casing and said key-holder plate as an integral one-piece casting, said key-holder plate support portion being slightly downwardly curved in a plane perpendicular to the parallel rows of the keys thereby providing a curved reference surface; and
said key-holder plate support portion supporting multiple guide portions which have guide holes for slidably guiding the corresponding keys between their non-operated and operated positions, said guide portions being formed such that centerlines of said guide holes extend parallel to each other, said guide portions having stopper parts which determine said non-operated positions of the corresponding keys, said stopper parts being disposed along the curvature of said curved reference surface, so that an operating surface of the keys which is generally defined by said top surfaces is downwardly curved following the curvature of said curved reference surface.

12. A keyboard according to claim 11, wherein said key-holder plate further includes longitudinal partition walls which extend downwardly parallel to each other and to said centerlines of said guide holes, from between parallel rows of said guide holes corresponding to said parallel rows of said keys.

13. A keyboard according to claim 11, wherein each of said guide portions consists of an annular portion defining said guide hole and connected at an intermediate part thereof to said support portion.

14. A keyboard according to claim 13, wherein said stopper parts consist of lower ends of said annular guide portions.

15. A keyboard according to claim 11, further comprising:
- a plurality of downward bosses extending downwardly from said upper casing;
- a printed circuit board disposed below said key-holder plate and having stationary electrodes which cooperate with movable electrodes movable with said keys, to constitute said switches;
- means for defining a curvature substantially parallel to the curvature of said curved reference surface; and
- fasteners for fixing said printed circuit board to said downward bosses, said fasteners cooperating with said curvature defining means to hold said printed circuit board in a curved configuration so as to follow the curvature of said curved reference surface.

16. A keyboard according to claim 11, wherein each of said keys comprises a keystem of a circular transverse cross sectional shape extending through the corresponding guide hole of the key-holder plate, a keytop provided on an upper end of said keystem and having said top face, and a rectangular bottom plate provided on a lower end of said keystem at right angles thereto.

17. A keyboard according to claim 16, wherein said key-holder plate has transverse partition walls each of which extends downwardly from between a corresponding pair of said guide holes, said transverse partition walls being formed perpendicularly to said plural parallel rows of the keys, and slidably contacting opposite two sides of said rectangular bottom plates of the keys to thereby prevent said keys from rotating about centerlines of the keystems.

18. A keyboard according to claim 17, further comprising a printed circuit board having stationary electrodes which cooperate with movable electrodes movable with said keys to constitute said switches, said transverse partition walls having lower end faces which cooperate with each other to generally define a curvature following the curvature of said curved reference surface, said printed circuit board being fixed to said upper casing in pressed contact with the curvature defined by said lower end faces of the transverse partition walls.

19. A keyboard according to claim 11, further comprising a printed circuit board having stationary electrodes which cooperate with movable electrodes movable with said keys to constitute said switches, said lower casing having a bottom portion and a plurality of support walls which extend upwardly from said bottom portion to support said printed circuit board.

20. A keyboard having a key-holder plate for movably supporting multiple keys of substantially the same shape and size in a plurality of parallel rows, multiple switches disposed so as to correspond to the multiple keys and provide electrical outputs upon depression of the keys at their top faces, an upper casing having a substantially rectangular aperture which accommodates upper portions of the keys and allows the keys to be operated, and a lower casing cooperating with the upper casing to enclose the multiple switches, wherein the improvement comprises:
- said upper casing and said key-holder plate being integrally molded of a synthetic resin, said upper casing having a pair of downward extensions extending downwardly from respective portions of inner surfaces of the upper casing which define opposite sides of said aperture perpendicular to said parallel rows of the keys, said key-holder plate having a support portion which is materially connected at its opposite longitudinal ends to said pair of downward extensions over entire lengths of the downward extensions and longitudinal ends, during molding of said upper casing and said key-holder plate as an integral one-piece casting, said key-holder plate support portion being slightly downwardly curved in a plane perpendicular to the parallel rows of the keys thereby providing a curved reference surface;
- said key-holder plate support portion supporting multiple guide portions supported by said slightly curved support portion, said guide portions having guide holes for slidably guiding the corresponding keys between their non-operated and operated positions, said guide portions being formed such that centerlines of said guide holes extend in radial directions of the curvature of said curved reference surface, said guide portions having stopper parts which determine said non-operated positions of the corresponding keys, said stopper parts being disposed along a curvature of said curved support portion, so that an operating surface of the keys which is generally defined by said top faces of the keys is downwardly curved following the curvature of said curved reference surface;
- each of said guide portions having an inclined outer surface, an angle of inclination of said outer surface being determined so as to prevent said outer surface from having an undercut section as viewed in a direction parallel to a line which passes through a central part of said key-holder plate at right angles thereto;
- each of said multiple switches comprising a movable electrode which is moved by the corresponding key in a direction of movement of the keys; and
- said key-holder plate further including multiple partition wall portions extending downwardly from said slightly curved support portion in said radial directions, said partition wall portions having lower end faces which cooperate with each other to generally define a curvature following the curvature of said curved reference surface, each partition wall portion surrounding the periphery of said movable electrode of the corresponding one of said multiple switches, said partition wall portions being tapered such that a thickness thereof is reduced in a direction from said slightly curved support portion toward a tip thereof, a value of taper of said partition wall portions being determined so as to prevent the partition wall portions from having an undercut section, as viewed in said direction parallel to said line passing through said central part of the key-holder plate.

* * * * *